Feb. 28, 1961 F. M. JOSEPH ET AL 2,973,412
LIMIT CONTROL MECHANISM
Filed Feb. 28, 1957
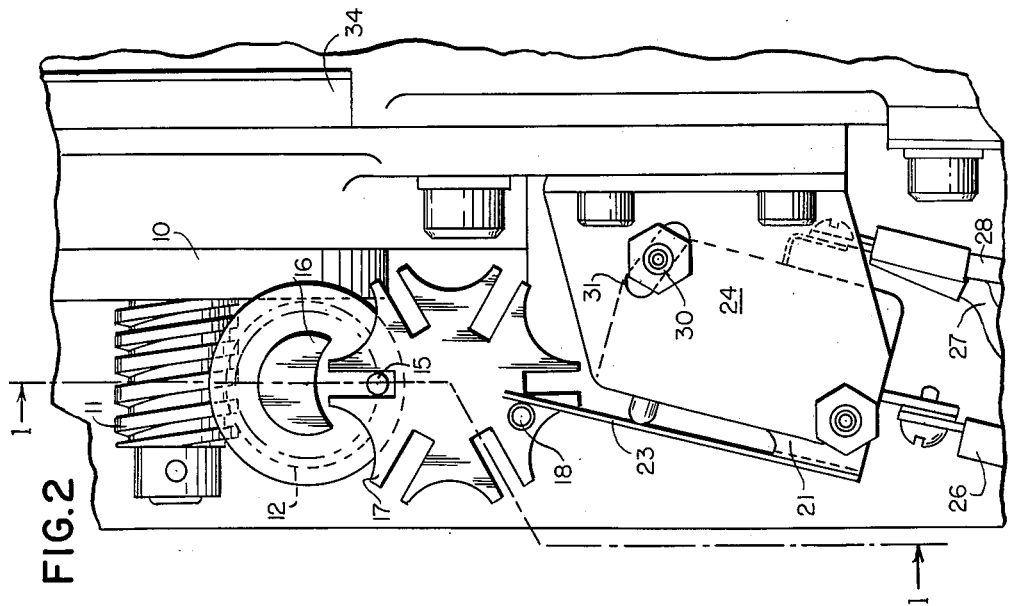
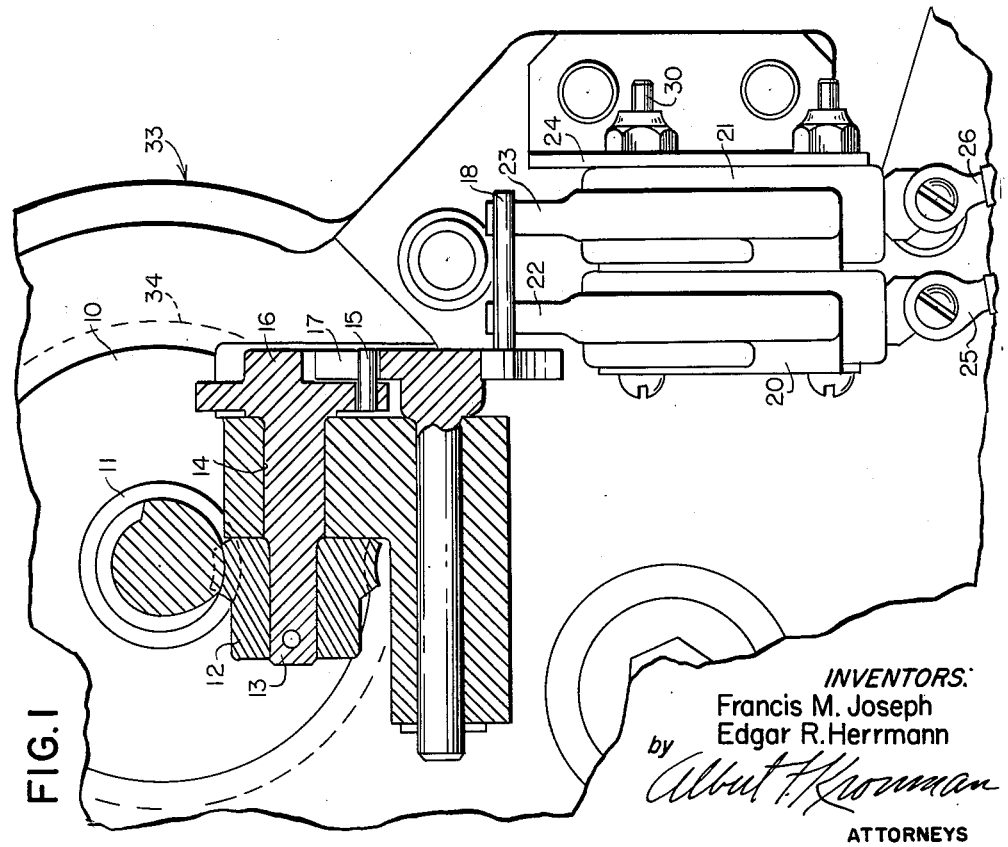
INVENTORS:
Francis M. Joseph
Edgar R. Herrmann
by Albert F. Kronman
ATTORNEYS United States Patent Office 2,973,412
Patented Feb. 28, 1961

2,973,412

LIMIT CONTROL MECHANISM

Francis M. Joseph, Bogota, and Edgar R. Herrmann, Maplewood, N.J., assignors to Breeze Corporations, Inc., Union, N.J., a corporation of New Jersey Filed Feb. 28, 1957, Ser. No. 642,988

2 Claims. (Cl. 200—47)

This invention relates to a mechanism which controls the movement of a driven object by limiting its travel in one or more directions. It has particular reference to a limit control mechanism which is to be reset quickly by a minimum of reverse motion.

Limit controls have been used in many applications where a restricted motion is desired. One example of such an application is a cable on a winch which, after being unwound by a large number of turns of the drum, is limited by a switch or valve mechanism. If the limit mechanism is coupled to the drum it is obvious that a large ratio of drum movement to control movement is necessary especially if the cable is long. All practical control devices such as electrical switches, hydraulic valves, and mechanical clutches are made to operate with considerable movement between their operating position and their reset position, and this movement in conjunction with the large ratio of drum to cable movements, results in a large movement of the cable in a reverse direction before the control can be reset.

The above stated conditions are not objectionable if the cable always moves from its fully extended position to its fully wound condition. However, if it is desired to reverse the cable motion to release a load or for better positioning after it has been moved a short distance from its limit of travel it is impossible to do so because the limit switch mechanism has not moved far enough to allow the limit switch to be reset.

The present invention employs an intermittent coupling device known as a Geneva wheel between the drum control and the limit switch. This arrangement overcomes the disadvantages of prior art systems and permits the lowering of a cable after it has been raised a short distance above its lower limit position.

One of the objects of this invention is to provide improved limit control mechanisms which avoid one or more of the disadvantages and limitations of prior art arrangements.

Another object of the invention is to provide a more accurate control over mechanisms which include limit control devices.

Another object of the invention is to vary the ratio of output motion to control motion at the point of limit actuation, thereby gaining greater control for resetting purposes.

The invention includes a driven mechanical means which is movable in two directions within a desired range of distances by a power driver. A control means is operated by the driven mechanical means through a mechanical coupling for preventing the power driver from moving the driven means beyond the desired range of distances. The mechanical coupling includes an intermittent gear with an engageable portion which actuates the control means.

For a better understanding of the present invention, together with other and further objects thereof, reference is made to the following description taken in connection with the accompanying drawings.

Fig. 1 is a cross sectional view taken along line 1—1 of Fig. 2 and shows one form of control means, the reduction gear, and the driven means.

Fig. 2 is a side view of the invention.

Referring now to the drawings, Figs. 1 and 2 show a driven means 10 connected to a worm screw 11 which meshes with a gear 12. Gear 12 is pinned to a shaft 13 which rotates in a bearing 14. At one end of shaft 13 a pin 15 and detent 16 are formed which cooperate with a slotted wheel 17 to form the well-known Geneva wheel intermittent gear. A stub shaft 18 is secured to wheel 17 to actuate a control means.

The control means in the preferred form of the invention comprises two electrical switches 20 and 21, each having operating arms 22 and 23. The switches may be secured by any convenient means such as a bracket 24 and are connected to other control means (not shown) by wires 25, 26, 27, and 28. The switches 20 and 21 are held by means of an adjustable bolt 30 which may be moved in a slot 31 to make minor adjustments in the control system.

In one form of the invention a winch, generally indicated at 33 in Fig. 1, winds a cable (not shown) on a drum 34 which is directly connected to worm screw 11. It will be obvious that the cable may be extended only a definite distance, depending upon its length, and it may be wound on the drum 34 for a finite number of turns which also depends on the length of the cable and the diameter of the drum. In both cases it is always convenient, and in some circumstances quite necessary, to employ a safety means such as limit controls which will prevent the cable from being over-extended or over-wound.

In order to control the limit mechanism, especially for a long length of cable, a reduction gear is necessary between the drum 34 and the limit means, which in this case is a combination of two switches 20 and 21. This reduction means includes, in the example shown in the drawings, the worm wheel 11 and its cooperating gear 12. If this reduction means were the only connection between the driven winch means 10 and switch arms 22 and 23 the action would be too slow to provide a definite limit control. The Geneva wheel combination 15, 16, and 17, is connected between the reduction gear 11, 12, in order to provide a definite fast-acting control means which can be adjusted accurately and which will reset switches 22 and 23 with only a small movement of the driven means 10.

A stub shaft 18 cooperates with switch arms 22 and 23 and is adjusted so that actuation of the switches is accomplished when the pin 15 is fully extended into one of the slots, that is, at the bottom of a slot in slotted wheel 17. In this manner the maximum movement of switch arm 23 is accomplished by the movement of worm gear 11.

As soon as switch arms 22 and 23 are actuated, the power means which drives the driven means 10 is disabled and an operator can then turn the mechanism in one direction only, to back up the system so as to reset switches 22 and 23. After resetting, the mechanism can be driven in either direction.

The above description of the operation is confined to a worm reduction gear and a winch with a cable but it will be obvious that the same type of mechanism can be coupled to any other mechanical system which moves between two limit points. Also the control means need not be electrical switches but may include hydraulic valves or mechanical clutches, the substitution of which can be made by anyone skilled in the art.

Having thus fully described the invention, what is claimed as new and desired to be secured by Letters Patent of the United States is:

1. A quick reset limit control operating mechanism for a reversible power source comprising a gear reduction train driven by the power source, a pin extending from the gear train, a Geneva wheel having a plurality of radial slots therein for driven engagement by the pin, a control arm carried by the Geneva wheel and extending outwardly thereof and power control means disposed in the path of the Geneva control arm so that the pin will enter one of the slots as the control arm reaches the power control means whereby the ratio of movement of the Geneva wheel rotating is increased as the control arm reaches the power control means.

2. A quick reset operating device according to claim 1 in which the power control means comprises at least one switch and a switch actuating arm extending therefrom in the path of the control arm.

References Cited in the file of this patent

UNITED STATES PATENTS

| | | |
|---|---|---|
| 1,299,116 | Bryce | Apr. 1, 1919 |
| 1,612,221 | Reller et al. | Dec. 28, 1926 |
| 1,654,238 | Chandler | Dec. 27, 1929 |
| 2,297,389 | Brandholt | Sept. 29, 1942 |
| 2,328,897 | Gill | Sept. 7, 1943 |
| 2,656,027 | Crookston | Oct. 20, 1953 |
| 2,791,648 | Maloney | May 7, 1957 |
| 2,852,630 | Burrows | Sept. 16, 1958 |
| 2,878,333 | McCarty et al. | Mar. 17, 1959 |

FOREIGN PATENTS

| | | |
|---|---|---|
| 15,591 | Great Britain | of 1907 |
| 149,943 | Austria | June 10, 1937 |
| 561,654 | Germany | Oct. 17, 1932 |